United States Patent Office 3,645,929
Patented Feb. 29, 1972

3,645,929
EXPANDABLE INSULATION COMPOSITIONS
James K. Normanton, Bishop Auckland, Durham, England, assignor to Bakelite Xylonite Limited
No Drawing. Filed July 22, 1969, Ser. No. 843,766
Claims priority, application Great Britain, July 19, 1968, 34,508/68
Int. Cl. C08f 47/10, 29/04; B44d 1/42
U.S. Cl. 260—2.5 E                10 Claims

ABSTRACT OF THE DISCLOSURE

Expandable compositions for electrical conductor insulation contain low density polyethylene and a small amount of high density polyethylene or polypropylene; expanded compositions and electrical conductor coated therewith.

BACKGROUND OF THE INVENTION

(1) Field of the invention

This invention relates to thermoplastic compositions useful in wire insulation. More particularly, the invention relates to expandable thermoplastic ethylene polymer compositions which are extrudable into a cellular covering around wire intended for electrical conducting applications.

(2) Description of the prior art

A variety of synthetic organic polymeric materials have been evaluated for use as insulation coverings for wires and other electrical conductors. Satisfactory materials for this purpose must have good electrical properties and an attractive surface appearance. Polyethylene, which possesses good electrical properties, having a relatively low dielectric constant, low power factor and a very high electrical strength, as well as being impermeable to water and water vapor, has been used extensively for wire insulation purposes. The electrical characteristics of multiconductor cables, such as telephone cables made of conductors insulated with solid polyethylene are superior to those of cables employing conventional paper insulated conductors. However, for given transmission characteristics, the former are more costly to make than the latter because polyethylene is more costly than paper. Also, cables employing solid polyethylene must generally be larger than paper insulated cables for the same transmission characteristics because solid polyethylene has a higher dielectric constant than does paper.

The disadvantages associated with the use of solid polyethylene may be ameliorated by using cellular polyethylene. Thus, with cellular polyethylene, the cable can be much smaller for the same transmission characteristics than a cable in which paper insulation is employed because the cellular polyethylene has a very low dielectric constant. Further, the presence of relatively large amounts of occulded gas in the cellular polyethylene insulations (e.g. 30% to 55% gas) reduces the weight of polyethylene required. As a consequence, the cost of cellular polyethylene insulation is more competitive with that of paper insulation.

In producing the cellular polyethylene covering, the polyethylene based composition is expanded, conveniently by incorporating a subustance (commonly referred to as a blowing agent) which, when heated, evolves as gas such as $CO_2$, $N_2$ or $N_2O$. In a commonly used method for producing the cellular insulation covering, a polyethylene based composition containing a suitable blowing agent is introduced into a screw extruder in which the composition is heated, usually at a temperature in the range 150 to 250° C., under pressure before being extruded through an extrusion die, and applied around a centrally disposed wire, say a copper wire. The evolution of gas normally commences in the extruder but, because of the pressure maintained within the extruder, complete expansion does not take place until the polyethylene composition emerges from the die and condenses around the wire.

While polyethylene, and in particular cellular polyethylene, is an advantageous insulation covering, difficulties are often experienced in operating the extrusion process to give a satisfactory covering. This is especially the case with high density polyethylene, which is a relatively intractable material and is not readily extrudable. Moreover, low density polyethylene, which generally extrudes easily and well, does not lend itself to very high speed extrusion wire covering. Speeds of 2000 to 3000 feet per minute are now quite usual in wire covering. These high speed extrusion rates are desirable from the standpoint of operating efficiency and, moreover, are a necessity in order to keep up with the demand for insulated wire without increasing costs to an uneconomic level. However, high speed extrusion rates when processing low density polyethylene causes extrusuion melt fracture, and results in extruded profiles having impaired surface characteristics, such as textuure, and irregular shapes (e.g. eccentricity).

SUMMARY OF THE INVENTION

A blend of low density polyethylene and high density polyethylene or polypropylene are used in an expanded form as electrical conductor insulation.

It is an object of this invention to provide an expandable ethylene polymer based composition endowed with the good electrical and physical properties of low density polyethylene as well as other advantageous properties and which, in addition, is extrudable at very high rates, for example, ≧2000 to 3000 feet per minute, into smooth surfaced, regularly shaped wire insulation covering. This and other objects of the invention are achieved by the selection, for the extrudable composition from which the insulation covering is derived, of an expandable ethylene polymer composition having certain properties.

DESCRIPTION OF THE PREFERRED EMBODIMENT

It has now been found that the objects of the present invention can be achieved by using, as electrical conductor insulation, an expanded composition formed an expandable composition which comprises:

(a) a low density ethylene polymer having a density not exceeding 0.935 and a melt flow index up to 7 grams per 10 minutes, (b) from about 1 to about 30 parts by weight, per 100 parts by weight of the low density ethylene polymer, of a high density ethylene polymer having a density above 0.939 and a melt flow index up to 20, and/or polypropylene; and (c) effective amounts of a blowing agent having a decomposition temperature of 150° C. or more.

LOW DENSITY ETHYLENE POLYMER

Suitable low density polyethylenes are homopolymers of ethylene and copolymers of ethylene with minor amounts, for example, up to 10% by weight, of one or more organic compounds which are copolymerizable therewith such as those which contain polymerizable unsaturation, such as is present for example in compounds containing an ethylene linkage $>C=C<$, for example, styrene, vinyl stearate, vinyl acetate, vinyl formate, monobutyl maleate, acrylic acid, methacrylic acid, methyl methacrylate, ethyl acrylate, 2-ethyl hexyl acrylate, propylene, butene, isoprene, butadiene, bicycloheptene, bicyclo heptadiene, and divinyl phosphonates. Many other copolymerizable monomers are well known in the art.

The preferred low density ethylene polymers are those having a density of from about 0.924 to about 0.930 and a melt flow index up to 2 grams per 10 minutes.

HIGH DENSITY ETHYLENE POLYMER

The high density ethylene polymers which may be present, in small proportions, in the compositions of this invention are preferably present in amounts of between about 1 and 6 parts by weight per 100 parts by weight of the low density ethylene polymer and are also preferably of a density above 0.944, and a melt flow index up to 6 grams per 10 miuntes.

The high and low density ethylene polymers are solid materials. The high density ethylene polymers are prepared by polymerizing ethylene and, if desired, minor amounts, e.g. 0.5 to 10%, of an alpha olefin copolymerizable therewith, such as butene-1, utilizing the conventional low pressure methods which have been practiced for many years.

POLYPROPYLENE

Polypropylene having the desired properties may, if desired, be included in the compositions as a substitute for or, in mixtures with, the high density ethylene polymers. The polypropylene is a solid material having a density of about $0.905 \pm 0.005$ and a melt flow index of up to about 10 grams per 10 minutes.

BLOWING AGENTS

The blowing agents that may be included in the expandable compositions of this invention are those which have decomposition temperatures above the softening point of the polymers employed, which is usually above 150° C. At the same time, the decomposition temperature of the blowing agent should not be above the temperature at which the degradation of the polymers would occur to any substantial extent. Preferred blowing agents are those that are solid at room temperature since they are then incorporated easily into the polymers. For economic reasons, it is preferred to use blowing agents that on decomposition provide large volumes of gas per volume of blowing agent, and, in general, the larger the volume of gas produced, the more attractive the blowing agent.

Suitable blowing agents include azodicarbonamide, and p,p'-oxy-bis-(benzene sulphonylhydrazide) which have decomposition temperatures in the ranges 190 to 230° C. and 150 to 160° C. respectively. Other suitable blowing agents include solvents, volatile liquids such as n-heptane, and gas such as nitrogen, dissolved in the polymer under pressure.

A highly suitable blowing agent system is one containing a major amount of azodicarbonamide and, as a secondary blowing agent, a minor amount of trihydrazino-sym-triazine. Advantageously, the ratio in parts by weight of the azodicarbonamide to the trihydrazino-sym-tirazine in the mixture is in the range 60:1 to 1.01:1, preferably 6:1 to 3:1.

The effective amount of the blowing agent or mixture needed in the compositions may vary over a fairly wide range depending, among other things, on the density desired for the cellular covering obtained on extrusion. Generally, the amount present will be in the range of about 0.1 to about 5 parts by weight per 100 parts by weight of the polymer. In many instances, it is preferred to employ from between about 0.1 to about 2 parts by weight per 100 parts by weight of the polymer. The amount of blowing agent used is that which will provide a degree of expansion in the expandable compositions of about 30 to 55%.

ADJUVANTS

In addition to the polymers and the blowing agent, the compositions advantageously include a lubricant to facilitate extrusion, a nucleating agent to assist in the development of the cellular structure on extrusion and a suitable high temperature anti-oxidant.

Suitable lubricants include fatty acids such as stearic acid, esters and semi-esters of such acids, mineral oils and natural and synthetic waxes. We find that best results, both from the standpoint of ease of processing and cellular properties, are obtained using 13-docosenamide. Typically, the lubricant is present in amounts of between 0.001 to about 1, preferably between about 0.02 and about 0.05, parts by weight per 100 parts by weight of the polymer, that is the total polymeric components of the expandable systems.

The nucleating agent should be inert towards both the polymers and blowing agent under the extrusion conditions, and should also be insoluble in the polymers. Metal oxides such as silica, titania, alumina, zirconia, barium oxide, magnesium oxide and metal salts such as sodium chloride, potassium bromide and calcium carbonate are suitable. It is essential that the nucleating agent be finely divided and uniformly dispersed throughout the composition. In general, the particle size of the nucleating agent should be smaller than 1 micron and preferably in the range of 0.001 to 0.5 micron. A nucleating agent which has been used is that commercially available under the trademark "Winnofil S," with an average particle size of less than 1 micron, and which is believed to be a coated calcium carbonate. The concentration of the nucleating agent desirable to achieve uniform nucleation varies with the degree of dispersion. Typically, however, it is present in an amount ranging from about 0.01 to about 2, preferably 0.02 to 1, parts by weight per 100 parts by weight of the polymer.

Suitable anti-oxidants for inclusion in the compositions of this invention include di-butyl-p.-cresol and other commercially available materials such as Topanol C.A., Santonox and Nonox W.S.P. These materials are chemically, 1,1,3 - tris( - 2 - methyl-4-hydroxy-5-tertiary butyl phenyl)butane, 4,4'-thiobis-6-tertiary butyl meta cresol and 2,2'-methylene-bis[6-(1-methyl cyclohexyl)-4-methyl phenol], respectively.

Other additives may be included in the compositions such, for example, as fillers, extenders, pigments or other coloring matter, modifiers and opacifiers.

The adjuvants or additives selected for use in each case are those which are normally employed with the particular type of expandable plastic being used. The adjuvants would be used in amounts which would be effective for the intended purpose. Thus, stabilizers would be used in a stabilizingly effective quantity and fillers would be used in effective quantities therefor. For example, if a reinforcing filler were to be used, such filler would be used in such amounts as to provide the desired reinforcing effect.

PROCESSING

The two types of ethylene polymers (components (a) and (b)), and the blowing agent, as well as any other desired constitutents, may be blended together by any of the techniques used in the art to blend and compound thermoplastics to homogeneous masses. For instance, the components may be fluxed on a variety of apparatus including multi-roll mills, screw mills, compounding extruders and Banbury mixers, or dissolved in mutual or compatible solvents.

When all the solid components of the expandable composition are available in the form of a powder, or as small particles, the compositions are most conveniently prepared by first making a blend of the components, say in a Banbury mixer or a continuous extruder, and then masticating this blend on a heated mill, for instance, a two-roll mill, and the milling continued until an intimate mixture of the components is obtained. Alternatively, a master batch containing the mixed blowing agent system and, if desired, some or all of the other components, may be added to the mass of polymers. Where the low density ethylene polymer is not available in powder form, the compositions may be made by introducing the polymer to the mill, masticating it until it forms a band around one roll, after which a blend of the remaining components is added and the milling continued until an intimate mixture is obtained. The rolls are preferably maintained at a temperature within the range 80° C. to 150° C. The composition in the form of a sheet is removed from the mill and then brought into a form, typically dice-like pieces, suitable for subsequent processing.

The invention is further illustrated by the following examples in which all parts are by weight unless indicated otherwise. The melt flow index describes the flow behavior of a polymer at a specified temperature and under a specified pressure. The values quoted in the examples, and elsewhere in this application, are determined by measuring the flow rate, expressed in grams per 10 minutes, according to the procedure of British Standard 2782, Part 1, 1965, Method 105C.

EXAMPLE 1

An expandable composition of the following formulation was prepared:

| Component: | Content |
| --- | --- |
| Low density polyethylene (density 0.928; melt flow index 1.0) | 95 |
| High density ethylene copolymer trade name Rigidex 40 (density 0.095; melt flow index 4.0) | 5 |
| Azodicarbonamide | 0.8 |

The components were thoroughly mixed in a Banbury mixer, and the mixture passed through a two-roll mill operating at a front roll pressure of 50 p.s.i.g. (steam) at 148° C. and a back roll pressure of 35 p.s.i.g. (steam) at 138° C. to form a sheet approximately 0.125″ thick. The sheet coming from the mill was cooled, and then fed to a dicing machine in which it was reduced to ⅛″ caubes. The cubes were then fed into a 2″ extruder fitted with a standard wire crosshead and a die with a single circular 0.030″ diameter aperture operating at a temperature of around 230° C, a compression ratio of 4:1 and a screw speed of 50 r.p.m. The molten expandable composition on emerging from the die contacted a 0.020″ diameter copper wire, preheated to 100° C. and travelling at 2,500 feet per minute. With the change in pressure on emerging from the die, the composition expands to provide a cellular covering. The covered wire was taken through a water bath maintained at 20° C. located in front of the die so that the travel of the wire from the die to the cooling medium is about 12″. The cellular covering had a density (at 20° C.) of 0.55 grams/cc. and a radial thickness of 0.008″, corresponding to a degree of expansion of around 40%. The wire coated with cellular composition had a preferably smooth surface both to the eye and to the touch, and there was little evidence of any melt fracture. Further, there was no separation between the wire and the insulation covering during processing. Pigmentating this composition did not affect the surface smoothness.

EXAMPLE 2

The procedure of Example 1 was repeated except that the expandable composition included a mixed blowing agent sysemt comprising 0.6 part of azodicarbonamide as a primary blowing agent, and 0.1 part of trihydrazino-sym-triazine as a secondary blowing agent. The results were the same as before, but processing performance and cellular properties, over a prolonged period, were superior.

EXAMPLE 3

An expandable composition of the following formulation was prepared:

| Component: | Content |
| --- | --- |
| Low density polyethylene (density 0.928; melt flow index 1.0) | 80 |
| High density ethylene copolymer (Rigidex 9) (density 0.96; melt flow index 0.9) | 20 |
| Azodicarbonamide | 0.6 |
| 13-docosenamide (lubricant) | 0.03 |
| Di-butyl-p-cresol (anti-oxidant) | 0.2 |

The composition was prepared in the same manner as that of Example 1 and a similar product was obtained. For wire coating the product gave excellent insulation properties and permitted high speed extrusion with good surface finish.

What is claimed is:

1. An expandable composition adaptable for coating electrical conductors comprising:
    (a) low density ethylene polymer having a density $\leqq 0.935$ and a melt flow index up to 7 grams per 10 minutes;
    (b) from about 1 to about 30 parts by weight, per 100 parts by weight of said low density ethylene polymer, of high density ethylene polymer having a density $>0.939$ and a melt flow index up to 20 grams per 10 minutes; and
    (c) effective amounts of blowing agent having a decomposition temperature above the softening point of said polymers.

2. An expandable composition as in claim 1 in which (a) is ethylene polymer having a density of from about 0.924 to about 0.930 and a melt flow index up to 2 grams per 10 minutes, and (b) is ethylene polymer having a density of greater than 0.939 and a melt flow index up to 6 grams per 10 minutes.

3. An expandable composition as in claim 2 in which (c) comprises a blowing agent selected from the group consisting of azodicarbonamide, p,p′-oxy-bis-(benzene sulphonyl hydrazide) and trihydrazino-sym-triazine.

4. An expandable composition as in claim 3 in which (c) comprises azodicarbonamide.

5. The composition of claim 1 in expanded form.

6. An insulated electrical conductor coated with the composition of claim 5 as the insulation.

7. In a process for coating electrical conductors with insulation coatings during high speed extrusion of such conductors, the improvement comprising insulating said conductors during said extrusion with an expanded coating composition formed from an expandable composition which comprises:
    (a) low density ethylene polymer having a density $\leqq 0.935$ and a melt flow index up to 7 grams per 10 minutes;
    (b) from about 1 to about 30 parts by weight, per 100 parts by weight of said low density ethylene polymer, of high density ethylene polymer having a density $>0.939$ and a melt flow index up to 20 grams per 10 minutes; and
    (c) effective amounts of blowing agent having a decomposition temperature above the softening point of said polymers.

8. A process as in claim 7 in which
    (a) is ethylene polymer having a density of from about 0.924 to about 0.930 and a melt flow index up to 2 grams per 10 minutes, and (b) is ethylene polymer having a density >0.939 and a melt flow index up to 6 grams per 10 minutes.

9. A process as in claim 7 in which (c) comprises a blowing agent selected from the group consisting of azodicarbonamide, p,p'-oxy-bis-(benzene sulphonyl hydrazide) and trihydrazino-sym-triazine.

10. A process as in claim 7 in which (c) comprises azodicarbonamide.

References Cited
UNITED STATES PATENTS

| | | | |
|---|---|---|---|
| 3,254,139 | 5/1966 | Anderson et al. | 260—2.5 E |
| 3,375,303 | 3/1968 | Joyce | 117—232 |

MURRAY TILLMAN, Primary Examiner

W. J. BRIGGS, Sr., Assistant Examiner

U.S. Cl. X.R.

117—232; 260—2.5 R, 897